United States Patent
Mehta

(10) Patent No.: US 11,531,544 B1
(45) Date of Patent: Dec. 20, 2022

(54) METHOD AND SYSTEM FOR SELECTIVE EARLY RELEASE OF PHYSICAL REGISTERS BASED ON A RELEASE FIELD VALUE IN A SCHEDULER

(71) Applicant: Hewlett Packard Enterprise Development LP, Houston, TX (US)

(72) Inventor: Sanyam Mehta, Hopkins, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/388,666

(22) Filed: Jul. 29, 2021

(51) Int. Cl.
| G06F 9/38 | (2018.01) |
| G06F 9/30 | (2018.01) |
| G06F 9/50 | (2006.01) |
| G06F 9/48 | (2006.01) |

(52) U.S. Cl.
CPC .......... G06F 9/30109 (2013.01); G06F 9/384 (2013.01); G06F 9/3826 (2013.01); G06F 9/3836 (2013.01); G06F 9/3863 (2013.01); G06F 9/4881 (2013.01); G06F 9/5011 (2013.01)

(58) Field of Classification Search
CPC .... G06F 9/3826; G06F 9/3836; G06F 9/3863; G06F 9/384
See application file for complete search history.

(56) References Cited

U.S. PATENT DOCUMENTS

| 6,959,435 | B2 | 10/2005 | Ju et al. |
| 7,478,198 | B2 | 1/2009 | Latorre et al. |
| 7,711,932 | B2 | 5/2010 | Akkary et al. |
| 8,880,854 | B2 | 11/2014 | Hooker et al. |
| 9,262,170 | B2 | 2/2016 | Krishna et al. |
| 9,274,795 | B2 | 3/2016 | Henry et al. |
| 9,311,084 | B2 | 4/2016 | Sundar et al. |
| 2004/0128489 | A1 | 7/2004 | Wang et al. |
| 2005/0120191 | A1 | 6/2005 | Akkary et al. |

(Continued)

OTHER PUBLICATIONS

"Standard Performance Evaluation Corporation", The spec cpu 2006 benchmark suite. [Online]. Available: https://www.spec.org/cpu2006/, retrieve date Apr. 26, 2022, pp. 3.

(Continued)

*Primary Examiner* — Jacob Petranek
(74) *Attorney, Agent, or Firm* — Park, Vaughan, Fleming & Dowler LLP

(57) ABSTRACT

The system creates, in a scheduler data structure, a first entry for a consumer instruction associated with a logical register ID. The first entry includes: a scheduler entry ID; a physical register ID allocated for the logical register ID; a checkpoint ID; one or more scheduler entry IDs for one or more prior producer instructions; and a release field which indicates whether to early release a physical register. The system updates a register alias table entry to include the scheduler entry ID and the checkpoint ID of the consumer instruction. The system receives the scheduler entry ID and a checkpoint ID for a respective prior producer instruction. Responsive to determining that the received checkpoint ID does not match the checkpoint ID associated with the consumer instruction, the system sets a release field to indicate that a physical register is to remain allocated.

20 Claims, 9 Drawing Sheets

| CONSUMER SCHEDULER ENTRY ID 212 | CONSUMER PHYSICAL REGISTER ID 214 | CONSUMER CHECKPOINT ID 216 | PRODUCER SCHEDULER ENTRY IDs 218 | RELEASE FIELD 220 |
|---|---|---|---|---|
| SCHEDULER ENTRY ID "P_SE1" | PHYSICAL REGISTER ID "P_PR1" | CHECKPOINT ID "P_CP1" | { PRODUCER SCHEDULER ENTRY ID "PP_SE1", ... } | RELEASE FIELD "value" |
| ... | ... | ... | ... | ... |
| SCHEDULER ENTRY ID "C_SE1" | PHYSICAL REGISTER ID "C_PR5" | CHECKPOINT ID "C_CP1" | { PRODUCER SCHEDULER ENTRY ID "P_SE1", ... } | RELEASE FIELD "value" |
| ... | ... | ... | ... | ... |

(56) References Cited

U.S. PATENT DOCUMENTS

| | | | | |
|---|---|---|---|---|
| 2007/0074006 | A1* | 3/2007 | Martinez | G06F 9/3859 712/228 |
| 2009/0327661 | A1 | 12/2009 | Sperber et al. | |
| 2012/0278596 | A1* | 11/2012 | Tran | G06F 9/3851 712/228 |
| 2014/0040595 | A1* | 2/2014 | Tran | G06F 9/3857 712/228 |
| 2014/0380023 | A1* | 12/2014 | Smaus | G06F 9/3838 712/216 |
| 2015/0268959 | A1 | 9/2015 | Krishna et al. | |
| 2017/0344374 | A1 | 11/2017 | Friedmann et al. | |
| 2019/0087192 | A1 | 3/2019 | Priyadarshi et al. | |
| 2020/0004541 | A1 | 1/2020 | Sankaranarayanan et al. | |

OTHER PUBLICATIONS

"Software-based speculative precomputation (ia-32)," in Intel Compiler (v9.0). [Online]. Available: http://astroa.physics.metu.edu/MANUALS/intel_icc/mergedProjects/optaps_cls/common/optaps_pgo_sspopt.htm, retrieved on Apr. 26, 2022, pp. 3.

"The graph500 benchmark," 2020. [Online]. Available: http://www.graph500.org/ Retrieve date Apr. 26, 2022, pp. 5.

Ainsworth, S., et al., "An event-triggered programmable prefetcher for irregular workloads," Twenty-Third International Conference on Architectural Support for Programming Languages and Operating Systems, Mar. 19, 2018, p. 578-592.

Ainsworth, S., et al., "Software prefetching for indirect memory accesses," Proceedings of the 2017 International Symposium on Code Generation and Optimization, ser. CGO '17. IEEE, Feb. 4, 2017, pp. 305-317.

Balkesen, C., et al., "Main-memory hash joins on multi-core cpus: Tuning to the underiying hardware," 2013 IEEE 29th International Conference on Data Engineering, Jun. 25, 2013, pp. 362-373.

Callahan, D., et al., "Software prefetching," Proceedings of the Fourth International Conference on Architectural Support for Programming Languagesand Operating Systems, Apr. 1, 1991, pp. 40-52.

Chen, T. F., et al., "Effective hardware-based data prefetching for high-performance processors," IEEE Transactions on Computers, vol. 44, No. 5, May 1995, pp. 609-623.

Chen, T.-F., et al., "Reducing memory latency via non-blocking and prefetching caches," Proceedings of the Fifth International Conference on Architectural Support for Programming Languages and Operating Systems, Sep. 1, 1992, pp. 51-61.

Collins et al.; Speculative Precomputation: Long-range Prefetching of Delinquent Loads; 2001; IEEE (Year: 2001).

Collins, J. D., et al., "Speculative precomputation: long-range prefetching of delinquent loads," in Proceedings 28th Annual International Symposium on Computer Architecture, Jul. 4, 2001, pp. 14 25.

Cooksey, R. et al., "A stateless, content-directed data prefetching mechanism," ACM SIGOPS Operating Systems, vol. 36, Issue 5, Oct. 1, 2002, pp. 279-290.

Ham, T. J. et al., "Desc: Decoupled supplycompute communication management for heterogeneous architectures," 2015 48th Annual IEEE/ACM International Symposium on Microarchitecture (MICRO), Dec. 9, 2015, pp. 191-203.

Hennessy, J. L. et al., "Computer Architecture, Fifth Edition: A Quantitative Approach", Morgan Kaufmann Publishers Inc., Sep. 2011, pp. 880.

Ishii, Y., et al., "Access map pattern matching for data cache prefetch," Proceedings of the 23rd International Conference on Supercomputing, Jun. 8, 2009, p. 499-500. [Online]. Available: https://doi.org/10.1145/1542275.1542349.

Jain, A., et al., "Linearizing irregular memory accesses for improved correlated prefetching," 2013 46th Annual IEEE/ACM International Symposium on Microarchitecture (MICRO), Dec. 11, 2013, p. 247-259.

Jaleel, A., "Memory characterization of workloads using instrumentation driven simulation—a pin-based memory characterization of the spec cpu2000 and spec cpu2006 benchmark suites," VSSAD Technical Report, 2007, pp. 1-12.

Jimborean, A., et al., "Fix the code, don't tweak the hardware: A new compiler approach to voltage-frequency scaling," in Proceedings of Annual IEEE/ACM International Symposium on Code Generation and Optimization, Feb. 2014, pp. 262-272.

Joseph, D., et al., "Prefetching using markov predictors," IEEE Transactions on Computers, vol. 48, Issue 02, Feb. 1999, pp. 121-133.

Kim et al.; Warped-Preexecution: A GPU Pre-execution Approach for Improving Latency Hiding; 2016; IEEE (Year 2016).

Kim, D., et al. "Design and evaluation of compiler algorithms for pre-execution," ACM SIGOPS Operating Systems Review, vol. 36, Issue 5, Dec. 2002, pp. 159-170.

Koukos, K., et al., "Towards more efficient execution: A decoupled access-execute approach," Proceedings of the 27th International ACM Conference on International Conference on Supercomputing, Jun. 2013, pp. 253-262.

Kuukos, K., et al., "Multiversioned decoupled access-execute: The key to energy-efficient compilation of general-purpose programs," Proceedings of the 25th International Conference on Compiler Construction, Mar. 2016, pp. 121-131.

Lau, E., et al., "Multicore performance optimization using partner cores," in Proceedings of the 3rd USENIX Conference on Hot Topic in Parallelism, ser. HotPar'11 USA: USENIX Association, 2011, pp. 7.

Lipasti, M. H., et al., "Spaid:software prefetching in pointer- and call-intensive environments," Proceedings of the 28th Annual International Symposium on Microarchitecture, Dec. 1, 1995, pp. 231-236.

Luk, C. K., et al., "Compiler-based prefetching for recursive data structures," Proceedings of the Seventh International Conference on Architectural Support for Programming Languages and Operating Systems, Oct. 1996, pp. 222-233.

Lumsdaine, A., et al. "Challenges in parallel graph processing," Parallel Processing Letters, vol. 17, No. 01, Mar. 1, 2007, pp. 5-20.

McCalpin, J.D., "Memory bandwidth and machine balance in current high performance computers," IEEE Computer Society Technical Committee on Computer Architecture (TCCA) Newsletter, Sep. 19, 1995, pp. 1-7.

Michaud, P., "Best-offset hardware prefetching," 2016 IEEE International Symposium on High Performance Computer Architecture (HPCA), Apr. 4, 2016, pp. 469-480.

Mowry, T. C., et al., "Design and evaluation of a compiler algorithm for prefetching," Proceedings of the Fifth International Conference on Architectural Support for Programming Languages and Operating Systems, vol. 27, No. 9, Sep. 1, 1992, pp. 62-73.

Mowry, T. C., "Tolerating latency through software-controlled data prefetching," PhD Thesis, Jun. 1, 1994.

Mutiu, O. et al., "Runahead execution: An alternative to very large instruction windows for out-of-order processors," The 9th International Symposium on High-Performance Computer Architecture,, Feb. 12, 2003, pp. 12.

Naithani et al.; Precise Runahead Execution; 2019; IEEE (Year: 2019).

Naithani. A., et al., "Precise runahead execution," 2020 IEEE International Symposium on High Performance Computer Architecture (HPCA), Apr. 16, 2020, pp. 397-410.

Nesbit, K. J. et al., "Data cache prefetching using a global history buffer," 10th International Symposium on High Performance Computer Architecture (HPCA'04), Feb. 18, 2004, pp. 10.

Ordaz et al.; A Reorder Buffer Design for High Performance Processors; 2012 (Year: 2012).

Pugsley, S. H., et al., "Sandbox prefetching: Safe run-time evaluation of aggressive prefetchers," 2014 IEEE 20th International Symposium on High Performance Computer Architecture (HPCA), Feb. 19, 2014, pp. 12.

Roth. A., et al., "Speculative data-driven multithreading," Proceedings HPCA Seventh International Symposium on High-Performance Computer Architecture, 2001, pp. 37-48.

(56) References Cited

OTHER PUBLICATIONS

Tramm, J. R. et al., "XSBench—the development and verification of a performance abstraction for Monte Carlo Yeactor analysis," in PHYSOR 2014—The Role of Reactor Physics toward a Sustainable Future, Sep. 2014, pp. 13.

Wikichip, "The sunny cove microarchitecture," 2020. https://en.wikichip.org/wiki/intel/microarchitectures/sunny_cove, Retrived on May 2, 2022, pp. 14.

Wu, Y., et al., "Value-profile guided stride prefetching for irregular code," Compiler Construction, 11th International Conference, Apr. 8, 2002, pp. 307-324.

Yu, X., et al., "Imp: Indirect memory prefetcher," in 2015 48th Annual IEEE/ACM International Symposium on Microarchitecture (MICRO), Dec. 9, 2015, pp. 178-190.

Zilles, C., et al., "Execution-based prediction using speculative slices," Proceedings of the 28th Annual International Symposium on Computer Architecture, Jul. 4, 2001, pp. 2-13.

\* cited by examiner

FIG. 1A

```
110.1    for (j = 0; active[j] > 1; j++) {
110.2       c = active[j];
110.3       m1 = mgau->mean[c];
110.4       v1 = mgau->var[c];
110.5       dval = mgau->lrd[c];
110.6       for (i = 0; i < veclen; i++) {
110.7          diff1 = x[i]-m1[i];
110.8          dval1 -= diff1 * diff1 * v1[i];
110.9       }
110.10      ...
110.11   }
```

LINES 110

FIG. 1B

```
130.1    .LBBmgau_eval:
130.2    I1: lsl      x12, x9, #2                  // Line 110.7
130.3    I2: ldr      s1, [x20, x12]               // Line 110.7
130.4    I3: ldr      s2, [x10, x12]               // Line 110.7
130.5    I4: ldr      s3, [x11, x12]               // Line 110.8
130.6    I5: add      x9, x9, #1                   // Line 110.6
130.7    I6: fsub     s1, s1, s2                   // Line 110.7
130.8    I7: fcvt     d2, s3                       // Line 110.8
130.9    I8: fcvt     d1, s1                       // Line 110.7
130.10   I9: fmul     d1, d1, d1                   // Line 110.8
130.11   I10: cmp     x9, x26                      // Line 110.6
130.12   I11: fmsub   d0, d2, d1, d0               // Line 110.8
130.13   I12: b.lt    .LBBmgau_eval                // Line 110.6
```

LINES 130

FIG. 1C

| INSTR ID 142 | MAPPING 144 (LOGICAL REG → PHYSICAL REG) | LIFETIME OF PHYSICAL REGISTER 146 | | |
|---|---|---|---|---|
| | | HARDWARE 147 | CPR 148 | SAGE 149 |
| I1 | x12 → PR0 | > MemLat | ~ MemLat | ~ 2 |
| I2 | s1 → PR1 | > MemLat | ~ MemLat | ~ 1 |
| I3 | s2 → PR2 | > MemLat | ~ L1Lat | ~ 1 |
| I4 | s3 → PR3 | > MemLat | ~ MemLat | ~ 2 |
| I5 | x9 → PR4 | > MemLat | ~ MemLat | ~ MemLat |
| I6 | s1 → PR5 | > MemLat | ~ MemLat | ~ 1 |
| I7 | d2 → PR6 | > MemLat | ~ MemLat | ~ 2 |
| I8 | d1 → PR7 | > MemLat | ~ MemLat | ~ 1 |
| I9 | d1 → PR8 | > MemLat | ~ MemLat | ~ 1 |
| I10 | cr → PR9 | > MemLat | ~ MemLat | ~ 2 |
| I11 | d0 → PR10 | > MemLat | ~ MemLat | ~ MemLat |

ENTRIES 150

FIG. 2A

| CONSUMER SCHEDULER ENTRY ID 212 | CONSUMER PHYSICAL REGISTER ID 214 | CONSUMER CHECKPOINT ID 216 | PRODUCER SCHEDULER ENTRY IDs 218 | RELEASE FIELD 220 |
|---|---|---|---|---|
| SCHEDULER ENTRY ID "P_SE1" | PHYSICAL REGISTER ID "P_PR1" | CHECKPOINT ID "P_CP1" | { PRODUCER SCHEDULER ENTRY ID "PP_SE1", ... } | RELEASE FIELD "value" |
| ... | ... | ... | ... | ... |
| SCHEDULER ENTRY ID "C_SE1" | PHYSICAL REGISTER ID "C_PR5" | CHECKPOINT ID "C_CP1" | { PRODUCER SCHEDULER ENTRY ID "P_SE1", ... } | RELEASE FIELD "value" |
| ... | ... | ... | ... | ... |

(200, with braces 210 and 212 grouping rows)

FIG. 2B

| LOGICAL REGISTER ID 232 | PHYSICAL REGISTER ID 234 | LAST INSTR. SCHEDULER ENTRY ID 236 | LAST INSTR. CHECKPOINT ID 238 |
|---|---|---|---|
| ... | ... | ... | ... |

| PHYSICAL REGISTER ID 252 | RESULTS 254 | CURRENT CHECKPOINT ID 256 |
|---|---|---|
| ... | ... | ... |

(250)

METHOD AND SYSTEM FOR SELECTIVE EARLY RELEASE OF PHYSICAL REGISTERS BASED ON A RELEASE FIELD VALUE IN A SCHEDULER

BACKGROUND

Field

This disclosure is generally related to the field of computer organization. More specifically, this disclosure is related to a method and system for a performant and resource-efficient microarchitecture.

BRIEF DESCRIPTION OF THE FIGURES

FIG. 1A illustrates an exemplary code excerpt, in accordance with an aspect of the present application.

FIG. 1B illustrates assembly language instructions corresponding to the exemplary code excerpt of FIG. 1A.

FIG. 1C illustrates a table depicting a comparison of physical register lifetimes for a conventional hardware design, the CPR system, and aspects of the system described herein, in accordance with an aspect of the present application.

FIG. 2A illustrates an exemplary scheduler data structure, in accordance with an aspect of the present application.

FIG. 2B illustrates an exemplary register alias table, in accordance with an aspect of the present application.

FIG. 2C illustrates an exemplary physical register file, in accordance with an aspect of the present application.

In the figures, like reference numerals refer to the same figure elements.

DETAILED DESCRIPTION

Figure 3:
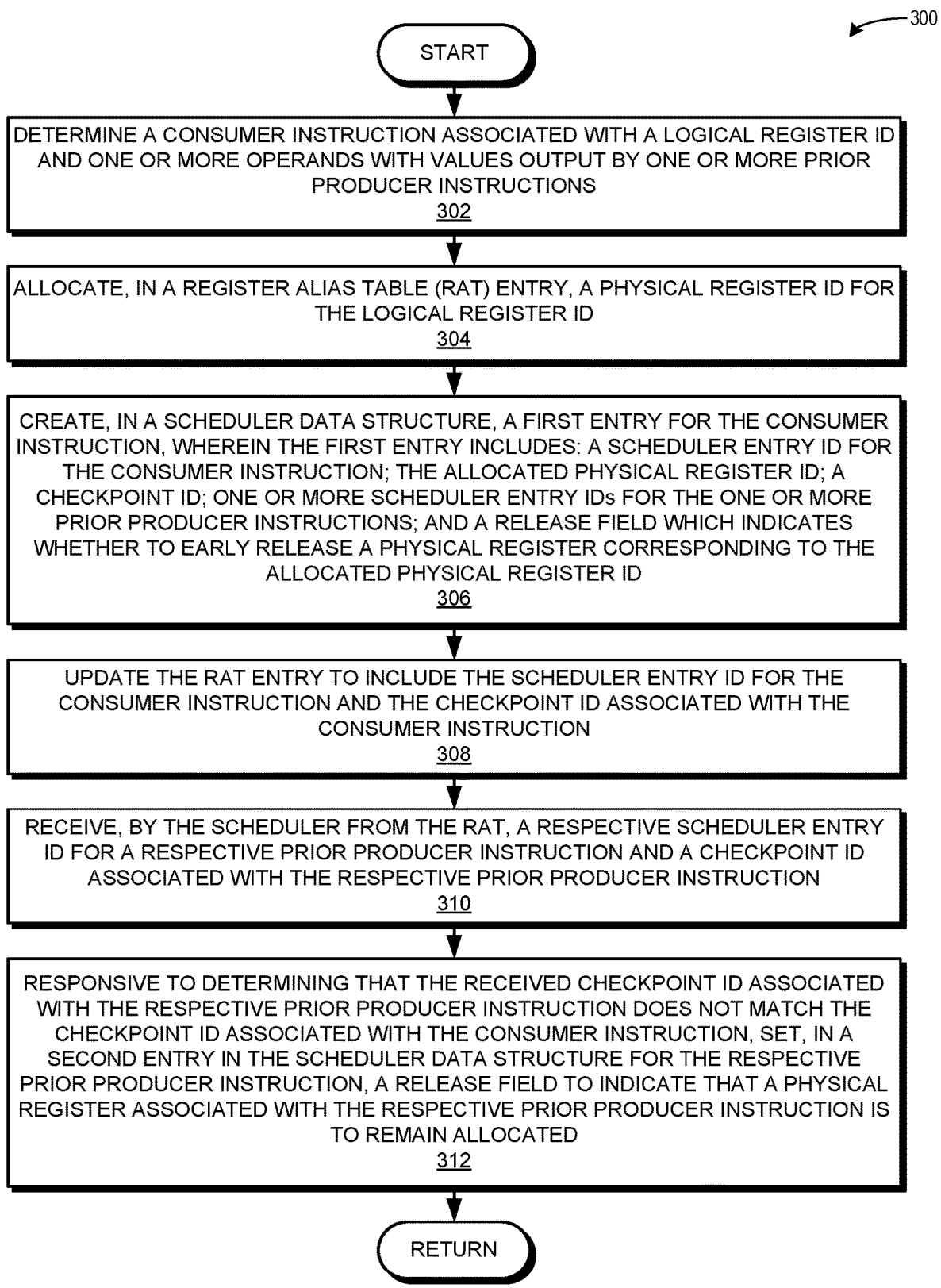
FIG. 3 presents a flowchart illustrating a method which facilitates processing of an instruction in a microarchitecture in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Moving from one generation of chips to the next has become increasingly expensive, both in terms of cost and time. Current trends to implement this move can involve, e.g., building custom chips, optimizing software/code, and using chiplets in favor of monolithic chips to migrate to smaller process nodes (and more cores). However, while building custom chips may be useful for certain areas/applications (such as artificial intelligence), many users continue to use the general purpose compute capability provided by central processing units (CPUs), e.g., in the cloud. For these users, single thread performance remains an important factor. On the other hand, co-locating multiple users/applications (as tenant users) on a single node can result in increasing core counts in a chip. As a result, improvements in core microarchitecture design remain crucial to provide performance gains at similar transistor counts which allow increasing core counts while ensuring quality of service (QoS) to each tenant user.

Two key and expensive structures used with the core include the Reorder Buffer (ROB) and the Physical Register File (PRF). The ROB determines the size of the instruction window, or the number of instructions that can execute out-of-order in a speculative processor. The size of ROB thus determines the amount of Instruction-Level Parallelism (ILP) that an application can extract out of the core, and is therefore a key measure of thread/core performance. As single thread performance become more important with multiple co-resident applications on a node (as in the cloud), a sharp increase can be seen in the size of ROB in emerging microarchitectures. As ILP improvements are projected in the industry, the ROB size is expected to increase even more significantly. This can be due to a move to chiplet-based design that is facilitating much bigger cores without affecting chip yields and/or cost, a trend which may continue as the industry moves to smaller process designs. These large instruction windows place increased pressure on the PRF, which must scale in the same order as the instruction window. Because the PRF is a many-ported structure, building large register files can be challenging, e.g., resulting in an increase in complexity and cycle time. The challenge remains to find a more scalable way to increase thread/core performance.

Overview of Advantages of Aspects of the Present Application

The ROB and PRF perform two important functions. First, these data structures hold the results of instructions from the time that an instruction finishes execution to the time that the instruction commits its results. Second, these data structures can aid in recovery from mis-speculations and/or handle exceptions. One current solution uses checkpoints not only to implement the second function, but also to eliminate the need for an ROB altogether (hereinafter referred to as "Checkpoint Processing and Recovery" or "CPR").

The described aspects also use checkpoints for the purpose of misprediction recovery instead of an ROB. However, the PRF is still needed to hold the results of completed instructions and thus can become a prominent source of a performance bottleneck. In the described aspects, the system can leverage a feature which is not used in current microarchitecture designs. In general, most of the program time is spent in loops, and most registers remain live within a single loop or iteration. In other words, most registers are "redefined" or "re-renamed" in consecutive iterations without being used across iterations, as described below in relation to FIGS. 1A-C. In general, only the induction and reduction variables (such as those storing counts, etc.) are used across iterations whereas many temporary variables are only used within an iteration. The system can "rename" a logical register to a physical register on a first or initial definition or assignment. The system can assign or "re-rename" the logical register to another physical register upon each subsequent definition. Thus, when a logical register is "redefined," the logical register is renamed again, or "re-renamed." The terms "redefined" and "re-renamed" are used interchangeably in this disclosure.

As a result, two conditions may be observed. First, because the registers are quickly re-renamed, the values of these instructions are only needed by a few immediate instructions, after which the physical register allocated to the instruction could be freed. Second, only the registers (corresponding to variables that are used across iterations) that are live across iterations need to hold their values in the register file for the purpose of mis-speculation recovery and exception handling.

These two conditions combined together can reduce not only the lifetime of a physical register, but also the number of total physical registers needed, which can result in an improvement in the overall design and performance of the core microarchitecture. However, one problem still remains. The instructions that hold the physical registers for the longest time are generally the long latency loads (and their consumers), which need to complete before these instructions can forward values (output operands) to their consumer instructions which are waiting to enter execution. In current microarchitectures, this forwarding relies on using the allocated physical register number or identifier (ID) as a tag to forward data to consumer instructions in the "scheduler" component (or "reservation stations"), which can imply that the physical register cannot be freed until a given instruction has completed.

The described aspects address these challenges by exploiting redundancy in the scheduler and the PRF to obtain a smaller PRF. The system can augment each scheduler entry to store not just the physical register identifier (ID) but also the scheduler entry identifier (ID) of the producer instruction. The system can similarly augment the register alias table (RAT) to store both the physical register ID and the scheduler entry ID for each logical register for renaming purposes. As a result, the system can use the scheduler entry ID as a tag to forward results of the producer instruction via the common data bus (CDB). Thus, as soon as a register is re-renamed and is not used across checkpoints (which is usually aligned to a loop iteration, as described herein), the corresponding physical register can be freed even though the instruction has not finished execution. This can free up physical registers that would have otherwise been occupied by long latency instructions as well as many dependent instructions. When the producer instruction finally completes execution, the system can forward the result only to the scheduler, and need not redundantly forward the result to the PRF. By removing this redundancy in data forwarding, the system can alleviate pressure on the PRF.

Moreover, the system can use checkpoints instead of the ROB to avoid in-order commit. Using checkpoints can complement the reduced register lifetimes, because neither the ROB nor the PRF would result in a significant performance bottleneck. When all instructions within a single checkpoint finish execution, the system can release the checkpoint, which can effect a bulk commit. However, because the described aspects align checkpoints with innermost loops (or maintain smaller checkpoints in general), and because the described aspects use only a few logical registers across iterations, the system need only allocate physical registers to those few logical registers. This is in contrast to current solutions, which may require that all registers that are live at the start of a checkpoint must remain allocated in the PRF even though those registers may be redefined without ever being used in the checkpoint, which can result in unnecessary pressure on the PRF. Smaller checkpoints can also result in a lower overhead with checkpointing, which is another optimization of the described aspects.

Finally, by combining the exploitation of the redundancy in the scheduler and the PRF to obtain a smaller PRF with the use of smaller or loop-aligned checkpoints, the described aspects can result in an improved performance in the overall core microarchitecture, e.g., by significantly reducing the size of the PRF without negatively impacting performance. Furthermore, by using these savings in chip area/power to augment other resources which can become performance bottlenecks (e.g., the scheduler/reservation stations and the load/store queue), the described aspects can result in a significant performance improvement while still being more resource-efficient. In other words, the described aspects can result in a more performant and resource-efficient core microarchitecture.

Exemplary Code Excerpts

The example provided below in relation to FIGS. 1A-C demonstrate that most registers in a loop tend to have a short live range, i.e., most registers are defined and used in the same iteration ("iteration-local live range"), while fewer registers are used across different iterations ("cross-iteration live range"). FIG. 1A illustrates an exemplary code excerpt 100, in accordance with an aspect of the present application. Exemplary code excerpt 100 can be an excerpt from the Sphnix3 Speech Recognition benchmark from the Standard Performance Evaluation Corporation (SPEC) Central Processing Unit (CPU) 2006 suite, and can include lines 110, indicated as lines 110.1-110.11. FIG. 1B illustrates assembly language instructions 120 corresponding to exemplary code excerpt 100 of FIG. 1A. Assembly language instructions 120 can include lines 130, including lines 130.1-130.13, where lines 130.2-130.12 correspond to instructions I1-I11, respectively. Corresponding code lines (of 110.1-110.11) are depicted with their code line label for each line or instruction of FIG. 1B. FIG. 1C illustrates a table 140 depicting a comparison of physical register lifetimes for a conventional hardware design, the CPR system, and aspects of the system described herein (referred to as "SAGE"), in accordance with an aspect of the present application. Table 140 can include entries 150 indicating and corresponding to each of instructions I1-I11 of FIG. 1B, where an entry in table 140 can include the following columns, fields, or information: an instruction identifier (ID) 142; a mapping 144 of a logical register to a physical register; and a lifetime of a physical register 146, for hardware 147, CPR 148, and described aspects (or SAGE) 149.

In code excerpt 100 of FIG. 1A, the loop-nest which includes lines 110.6-110.9 may result in the most time-consuming portion of this benchmark code excerpt. Consider the innermost loop i beginning at line 110.6. Note that the variable diff1 is defined in line 110.7 and used in line 110.8. Because this variable is redefined in line 110.7 on the next iteration, the live range of this variable is from line 110.7 to line 110.8 within the same iteration.

On the other hand, the variable dval1 (which is a reduction variable) is defined in line 110.8 and then used again in line 110.8 on the next iteration, i.e., the live range of dval1 is also short but spans across iterations. In addition to dval1, the induction variable i also similarly has a short live range that spans across iterations. Thus, based on the source, it can be seen that all variables in code excerpt 100 have short live ranges. Of those variables, a few have iteration-local live ranges while others have cross-iteration live ranges. However, in looking at the corresponding assembly code in FIG. 1B, it can be seen that there are many more variables with iteration-local live ranges than cross-iteration live ranges. For example, each of the three load operations in loop i are assigned unique logical registers (e.g., registers s1-s3 in instructions I2-I4 of FIG. 2B), all of which have iteration-local live ranges. Similarly, register x12 in instruction I1 has an iteration-local live range. Thus, code excerpts 100 and 120 demonstrate that there are more variables with iteration-local live range than cross-iteration live range.

Consider the outer loop j beginning at line 110.1. Many of the variables/registers (such as in lines 110.2-110.5 in FIG. 1A) have an iteration-local live range. While the example depicted in FIGS. 1A and 1B is a simple example, this observation can be generally true because complex instructions in the source are broken into micro operations in the assembly/object code requiring the use of more registers with iteration-local live range.

Quick Recycling of Physical Registers with Short Live Range.

In an ROB-based architecture, a physical register (assigned to some logical register) can be freed when another instruction with the same destination logical register is finally committed. Thus, the lifetime of a physical register is exaggerated. For example, in FIG. 1B, even though some instructions such as I1, I5 and I10 have short latency, these instructions still need to wait for older memory operations to complete and commit results before releasing their physical registers. Furthermore, since instructions commit in order, the actual lifetime of these instructions is even longer than the memory access time, as indicated in FIG. 1C. In the prior solution of CPR, checkpointing combined with aggressive register reclamation can help to reduce this exaggerated lifetime, because a physical register need no longer wait for the next renaming instruction to commit. However, mere checkpointing may not be sufficient to reduce contention for physical registers, because the instruction associated with a physical register must still complete and forward its value to all consumers before the register can be released.

For example, consider the loads m1[i] (instruction I2 in FIG. 1B) and v1[i] (instruction I4 in FIG. 1B) in loop i. Both of these loads have multiple levels of indirection and may come from memory by evading the hardware prefetcher. As a result, these loads involve long latency operations. Thus, even though the physical registers holding the result of these loads is not used beyond a few instructions, the physical registers must remain occupied until these loads complete. Table 140 of FIG. 1C depicts that the lifetime of physical registers assigned to instructions I2 and I4 is greater than the main memory access time (indicated by ">MemLat" when using a conventional hardware design, column 147) or nearly equals the main memory access time (indicted by "~MemLat" when using the CPR design, column 148). The same is true for all instructions that depend on these loads (i.e., instructions I6, I7, I8, I9, and I11), which practically means more than half of the entire loop.

In contrast, the described aspects utilize these short live ranges for much more aggressive register reclamation.

Recall that there is redundancy in the core microarchitecture. When an instruction completes execution, the system forwards its results to the scheduler/reservation stations for any consumer instructions already issued, and also to the PRF to provide operands for future consumer instructions that have not yet issued. Given the short live ranges, it can be observed that there are only a few consumer instructions. Thus, holding a physical register after all consumer instructions have issued is redundant. In current microarchitectures (including the conventional hardware design and the CPR design), physical registers are held until instruction completion, because the physical register ID serves as a tag for forwarding data to the right instructions in the scheduler via the CDB.

In the described aspects, the system breaks this dependence by augmenting the scheduler to use the scheduler entry ID of the producer as the tag for forwarding data to the consumers via the CDB. As a result, the long latency loads along with their dependent instructions no longer need to hold physical registers until completion, which in turn can result in freeing up a big pool of registers much sooner, as shown by the significantly fewer cycles expended by SAGE 149 for most of instructions I1-I11 in FIG. 1C.

Exploiting Iteration-Local Live Ranges for Further Reduced Contention for Physical Registers As described above, prior checkpoint-based designs (like CPR) require that all logical registers that are live at the beginning of a new checkpoint retain their physical registers until all instructions of the new checkpoint complete and the checkpoint is released. This can allow those systems to restore the correct processor state at the beginning of the checkpoint where instruction mis-speculation or an exception takes place. In the code excerpt of FIGS. 1A and 1B, physical registers for instructions I1, I4, I5, I7, I9, I10 and I11 must all remain allocated assuming that checkpoint starts at the beginning of the loop, because these instructions are not redefined before the start of the next iteration/checkpoint. These physical registers are not insignificant in number. The instructions thus need to wait for the completion of all instructions in the next checkpoint, where some of the instructions depend on data from main memory. As a result, the lifetime of these instructions is again nearly equal to the main memory access time, as shown by the "~Mem Lat" value shown for the lifetime of physical registers in CPR 148. Overall, only instruction I3 (which has data in L1 cache and is re-renamed within the same checkpoint (in instruction I7)) can release its physical register sooner than existing/conventional designs, as shown by the "~L1Lat" value shown for the lifetime of the physical register for instruction I3 in CPR 148.

Looking further into the next checkpoint, it can be seen that logical registers x12, s3, d/s1 and d/s2 are redefined without being used, so it is unnecessary to hold their corresponding physical registers from the last checkpoint to enable a correct checkpoint restart. To take advantage of this, the described aspects of the system sagaciously wait for instructions in the next checkpoint to issue, and the system is thus able to learn that many of the instructions that were live at checkpoint restart are redefined or re-renamed without any use (i.e., confirming that certain instructions do indeed have an iteration-local live range). As a result, only physical registers that are live at checkpoint start and whose corresponding logical registers are used in the checkpoint before being redefined/re-renamed need to remain allocated.

In the example of FIG. 1B for the described aspects, only physical registers allocated to Instructions I5 and I11 satisfy this condition and thus remain alive until the checkpoint can be released, which can lead to a lifetime roughly equal to main memory access time, as shown by the "~Mem Lat" value shown for the lifetime of physical registers in aspects 149. In the described aspects, all other physical registers can be freed soon after their logical register is re-renamed, which happens after 1 or 2 cycles (assuming 5 instructions can issue/rename each clock), as shown by the "~1" and "~2" values shown for the lifetime of physical registers in SAGE 149.

Thus, FIG. 1C depicts the significant improvement in physical register lifetimes achieved by the aspects of the present application over existing designs (147) and prior checkpoint-based proposals (148). The decision to wait for instructions in the next checkpoint to issue can also allow the scheduler to provide the correct tag to instructions which are entering execution. That is, the instructions that can now free their physical registers can forward their scheduler entry ID as the tag to use for data forwarding upon completion, in contrast to the other instructions which use the conventional physical register ID as the tag for data forwarding upon completion.

Enabling Smaller Checkpoints

As described here, prior microarchitecture designs require that all live registers at checkpoint start remain allocated, and thus favor larger checkpoints (i.e., checkpoints with more instructions possibly spanning multiple loop iterations). However, large checkpoints may result in several drawbacks. First, in the event of a misprediction within a checkpoint, all instructions in the checkpoint must re-execute, including the instructions which occur before the mispredicted branch. Therefore, with larger checkpoints, this overhead can be larger. Second, larger checkpoints can imply that instructions that are live at a checkpoint beginning need to wait longer before their physical registers can be freed. Third, smaller checkpoints are often unavoidable due to unpredictable branches (even within loops), and in those cases, many physical registers may remain allocated for longer than needed, as explained herein.

In contrast, the described aspects can enable smaller checkpoints by early releasing physical registers for logical registers with iteration-local live range. Generally, in a loop, most variables except reduction variables (such as d0) or induction variables (such as x9) have an iteration-local live range. The described aspects can thus be configured to align checkpoints to loop iterations (such as to a branch within a loop) to reap maximum benefits from physical register reclamation as long as the loops are small (which can often be true for innermost loops). The described aspects use a small threshold in terms of number of instructions (e.g., 24) for checkpoint creation to keep the checkpoint small. Additionally, the smaller checkpoints can be helpful in reducing overhead and avoiding any deadlocks. This is because the described aspects require instructions to wait until re-renaming and potentially until all instructions in the next checkpoint are issued. That is, smaller checkpoints can ensure shorter wait times and sufficient resources for at least two checkpoints.

Prior Designs vs. Described Aspects of Present Application

The prior designs (e.g., CPR) introduced the idea of using checkpoints along with an alternate register reclamation technique that led to an ROB-free microarchitecture. In those prior designs, the checkpoints are created at low-confidence branches and contain a snapshot of the register alias table (RAT) at that branch, which can be used to restart execution of instructions in the checkpoint in the event of a branch misprediction in any instruction belonging to the checkpoint. For example, CPR uses an aggressive register reclamation technique that releases a physical register as soon as it is re-renamed and all consumer instructions have read its results. This can be viewed as aggressive when compared to ROB-based register reclamation where a physical register is released when the instruction that re-renames the associated logical register is finally committed. Additionally, CPR breaks away from the in-order commit in ROB-based designs. That is, when all instructions in a checkpoint complete (which can be tracked using a checkpoint ID associated with each instruction and a counter per checkpoint tracking instructions), the checkpoint can be committed instantaneously, which can provide the appearance of a bulk commit. CPR can enable recovery from mispredictions and exception handling by holding physical registers that are live at the start of a checkpoint until the checkpoint commits.

The described aspects of the present application can utilize the benefits of bulk commit and be ROB-free. However, as described above, CPR-based architectures suffer from the now more prominent bottleneck in the form of the physical register file (PRF). This is because long latency operations and their consumers in the dependence chain continue to hold physical registers until completion. The described aspects, along with the below two features, can reduce this pressure on PRF, as described below and in relation to FIGS. 2A-D.

In CPR, in order to implement aggressive register reclamation, CPR uses a counter for each physical register that tracks its use by consumers. In contrast, in the described aspects, the system uses a feature which includes a data-capture scheduler to ensure that data will be read by consumers one cycle after completion of the producer. This can result in eliminating the use of these counters. In the described aspects, a data-capture scheduler is used. However, note that in other aspects, the features of the described aspects still hold for non-data-capture schedulers (with slight changes).

The CPR design proposes using as few as 8 checkpoints for a large instruction window, e.g., ranging from 512 to 2048 entries for a set of benchmark tests for evaluating the CPU performance in integer operations (SPECFP) and a set of benchmark tests for evaluating the CPU performance in floating-point operations (SPECINT), respectively. However, because CPR bears additional re-execution overhead at mis-speculation, adding more checkpoints can reduce this overhead. On the other hand, smaller checkpoints can also increase the number of registers that are live at checkpoint creation, leading to more pressure on the PRF and performance loss in CPR. In contrast, in the described aspects, the system uses smaller checkpoints that it attempts to align to innermost loops (if they are small enough) to not only reduce the re-execution overhead, but also to reduce the number of physical registers that need to remain allocated at each checkpoint (based on the prior discussion of loops, related to the iteration-local live range as explained herein). These smaller aligned checkpoints may requires more RAT checkpoints, but contemporary hardware already supports fairly large numbers of RAT checkpoints.

Scheduler Component

In the described aspects, as each instruction is issued, it is allocated an entry in a "scheduler" or "scheduler component" (or the "reservation stations"). The scheduler tracks whether all operands of an instruction have arrived, and when all the operands of an instruction have arrived, the scheduler can mark the instruction as ready to enter execution.

A conventional scheduler data structure has fields such as 'Busy', 'Instruction/Operation', 'Ready1/2', 'Data1/2' (for data-capture schedulers) and 'Destination'. The 'Destination' field can hold the physical register ID of the instruction. This is because when an instruction completes execution, the conventional system broadcasts its results along with a tag on the common data bus (CDB). Because the results must be forwarded simultaneously to both the PRF and the scheduler, the conventional system uses the same tag used for the broadcast.

In contrast, the described aspects broadcast differently. As explained above, the conventional system uses the physical register ID as a tag for broadcasting data even to the scheduler that requires that the physical register should remain allocated even though it is re-renamed. In order to decouple the data broadcast to just the scheduler from the data broadcast to both the scheduler and the PRF, the described aspects add, to each scheduler entry, another field which also tracks the scheduler entry ID of the source operands. In addition, in the described aspects, each scheduler entry contains a checkpoint ID to identify the checkpoint to which it belongs, and further contains a 'release' field (e.g., a bit or a flag) to indicate whether or not to early release the physical register. Note that the physical register is always allocated upon instruction issue as in conventional designs and CPR, but the physical register may be released early, as described herein. This release field is set by default (e.g., to a value of '1'), to indicate early release for the physical register. The described aspects can reset this release field (e.g., to a value of '0'), to indicate that the physical register is to remain allocated. Similar changes can also apply to the load queue.

FIG. 2A illustrates an exemplary scheduler data structure 200, in accordance with an aspect of the present application. Scheduler data structure 200 can include entries with fields or columns, such as: a consumer scheduler entry ID 212; a consumer physical register ID 214; a consumer checkpoint ID 216; producer scheduler entry IDs 218 (e.g., one or more scheduler entry IDs for one or more prior producer instructions associated with a consumer instruction in a given or same entry); and a release field 220. Note that these fields are labeled as "consumer" and "producer" only to differentiate the various identifiers. Each entry can correspond to a particular "consumer" which can be a "producer" for another entry, and which can rely on operand values output by a prior "producer" instruction. For example, an entry 212 can correspond to a "consumer" (such as instruction I6 in FIG. 1B), with values of: scheduler entry ID="C_SE1"; physical register ID="C_PR5"; checkpoint ID="C_CP1"; producer scheduler entry IDs={"P_SE1", . . . }; and release field="value," e.g., '0' or '1' if a bit field. The corresponding "producer" entry for the consumer entry 212 can be an entry 210 (such as instruction I2 in FIG. 1B), with values of: scheduler entry ID="P_SE1"; physical register ID="P_PR1"; checkpoint ID="P_CP1"; producer scheduler entry IDs={"PP_SE1", . . . }; and release field="value," e.g., '0' or '1' if a bit field.

Furthermore, similar to these three additional fields in the scheduler entry (e.g., fields 216, 218, and 220 of FIG. 2A), the RAT can store more information than in conventional designs. In the described aspects, in addition to just storing the map between the logical registers and physical registers, the system can augment the RAT to also store two additional fields—the scheduler entry ID and the checkpoint ID of the instruction that last writes the logical register.

FIG. 2B illustrates an exemplary register alias table (RAT) 230, in accordance with an aspect of the present application. RAT 230 can include entries with fields or columns, such as: a logical register ID 232; a physical register 234, which is assigned or mapped to logical register ID 232; a last instruction scheduler entry ID 236; and a last instruction checkpoint ID 238. That is, fields 236 and 238 can include, respectively, the scheduler entry ID and the checkpoint ID for the instruction which most recently writes the logical register.

Finally, the PRF can be augmented with an additional field such that each PRF entry holds the checkpoint ID of the checkpoint that re-renames the physical register. FIG. 2C illustrates an exemplary physical register file 250, in accordance with an aspect of the present application. Physical register file 250 can include: a physical register ID 252; results 254; and a current checkpoint ID 256, which indicates the checkpoint ID of the checkpoint which redefines the given physical register.

The above changes/additions/augmentations in the scheduler and RAT can be relatively simple, assuming that additions allow the system to considerably scale down the many-ported integer and floating point physical register files. These changes to the scheduler and RAT can affect the different stages in the lifetime of an instruction, as described below and in relation to FIGS. 3A-3D.

Stages of Processing Instructions in Described Aspects

In this disclosure, terminology is used similar to that described in J. L. Hennessy and D. A. Patterson, *Computer Architecture, Fifth Edition: A Quantitative Approach*, 5th ed., San Francisco, Calif., USA: Morgan Kaufman Publishers Inc., 2011 (hereinafter "Hennessy"). Thus, in a dynamically scheduled processor with speculative execution, an instruction can be processed by going through four stages—issue, execute, write result, and commit.

Instruction Issue

In this first stage, in the conventional designs, an already decoded instruction is allocated a reservation station (i.e., a scheduler entry) (or an entry in a load/store queue for a load/store) and an entry in the ROB (along with a physical register). If either the reservation stations or the ROB is full, the current and proceeding instructions are stalled at this stage. In checkpoint-based designs, the instruction issue only requires non-full reservation stations and an available physical register. In this step, the system can also update the RAT and thus effectively perform register renaming. The system can also obtain the operands in this step. Either the operands are available or their arrival information is obtained. The system can check the RAT to obtain the source of the operand. Here, one of two scenarios results: either the operand is ready, in which case the value is received from the physical register (whose ID is obtained from the RAT); or the operand is not yet ready, in which case the value will arrive from the CDB upon completion of the producer instruction. The latter case may be especially true for long latency instructions which hold the physical registers the longest. This is the case which can be optimized by the described aspects, which can perform some book-keeping operations in the issue stage.

(1) First, in addition to updating the physical register ID in the RAT, the described aspects can also update the scheduler entry ID and the checkpoint ID in the RAT. This update requires an additional 16 bits (i.e., 8-bits each for the scheduler entry ID and the checkpoint ID) in the datapath from the scheduler to RAT. (2) Second, in addition to receiving just the physical register ID of the producer instruction for its waiting operand from the RAT, the scheduler can also receive the scheduler entry ID and the checkpoint ID of the producer. This requires increasing the size of datapath by 16 bits (e.g., again, 8-bit each) from the RAT to the scheduler. (3) Third, and lastly, the system can compare the checkpoint ID of the producer received above in (2) against the checkpoint ID of the waiting operand of the consumer. If they are different (indicating a cross-iteration live range), the system can reset the 'release' field for the producer entry in the scheduler (e.g., set the value to '0' from a default value of '1'), indicating that the corresponding physical register must remain allocated. The system can index the producer based on the scheduler entry ID of the producer, which is also received in (2). The system can account for the reset of the 'release' field or bit in a one-cycle delay. All the other book-keeping operations can occur alongside the conventional book-keeping operations and add no timing overhead to this issue stage. Additionally, the noted increase in datapaths may be manageable in existing designs of wide-SIMD (single instruction, multiple data).

Instruction Execute

The system can determine or check the readiness of the operands by monitoring the CDB to see if a broadcasted tag matches that of a waiting operand. In conventional designs, when all operands of an instruction are ready, the instruction begins execution as soon as there is an available execution port. In the described aspects, the scheduler additionally checks: (a) the 'release' field or bit; (b) the physical register for the corresponding logical register in the RAT (to check if the logical register has been re-renamed); and (c) the checkpoint ID of the last issued instruction (obtained from a global counter that tracks checkpoint ID assigned to latest checkpoint).

If the system determines that the 'release' field or bit is reset (indicating cross-iteration uses), the instruction can enter execution and the physical register for the instruction remains allocated. In this case, the scheduler can forward the physical register ID to the execution unit as the tag to use for broadcasting the result upon completion of execution.

If the system determines that the 'release' field or bit is set (indicating no cross-iteration uses) and if the logical register has been re-renamed, the instruction can enter execution. In this case, the scheduler forwards the scheduler entry ID (instead of the physical register ID) to the execution unit and the physical register is freed. As discussed above, most instructions are redefined or re-renamed in the same or immediate next iteration, and thus no instruction is made to wait longer than all instructions in the immediate next checkpoint have issued. This can be ensured by comparing the checkpoint ID of latest checkpoint and the checkpoint ID of the instruction waiting to enter execution. The system can obtain the result of the execution from, e.g., an execution unit.

Write Result

In conventional design, once an instruction finishes execution, the result is written on the Common Data Bus (CDB), and from the CDB into the awaiting physical registers and reservation stations using the physical register ID as the tag. In the described aspects, the system can use as the tag either the physical register ID (in case a physical register is still allocated) or the scheduler entry ID (in case the physical register was released early). These two events can be differentiated by a bit that is also forwarded to the execution unit by the scheduler and is used in the broadcast. This bit can be used to select either the physical register ID field or the scheduler entry ID field in each scheduler entry for the purpose of a tag match (e.g., implemented via a multiplexer). If the bit indicates the former event (e.g., to use the physical register ID), the data forwarding proceeds as in conventional designs. If the bit indicates the latter event (e.g., to use the scheduler entry ID), however, the data is not forwarded to the PRF at all, and is only forwarded to the scheduler. Note that the size of the tag that is broadcasted, whether the physical register ID or the scheduler ID (plus a bit), is of similar length since the size of PRF and the scheduler are similar.

Commit/Retire

At this stage in the conventional design, the architectural state (register file or memory) is finally updated, and the instruction frees the ROB entry. That is, the physical register of an instruction i is freed when an instruction j that writes to the same logical register as instruction i is committed. In CPR, the physical register of an instruction i that is live at the end of a checkpoint is freed when another checkpoint containing instruction j that rewrites the same logical register as instruction i is committed. Furthermore, a checkpoint in CPR is freed when all instructions in the checkpoint complete.

In contrast, in the described aspects, physical registers allocated to logical registers that have no cross-iteration uses can be freed early. Other physical registers can be released similarly as in CPR, i.e., when the checkpoint is released. The described aspects include two main differences over CPR. First, the described system can release a checkpoint when all instructions in the immediate next checkpoint have finished execution. This is because if a mis-speculation happens in the immediate next checkpoint (such as at the end of innermost loop i in FIG. 1A), the physical registers that were live at the start of the last checkpoint must remain allocated to ensure correct recovery. The same mechanism is used to implement precise interrupts/exceptions as also done in the CPR design. Second, in order to help the release of a physical register, the described system can update the checkpoint ID field for the physical register in the PRF to indicate the checkpoint ID of the instruction that re-renames its logical register. This can result in saving some overhead, as compared to CPR which tracks this liveness of a physical register using counters. In the event of a mis-speculation in any checkpoint, the execution can restart from the preceding checkpoint to again ensure correct mis-speculation recovery.

However, because the described aspects use smaller checkpoints, this does not add any considerable additional overhead. The data load/store queues can similarly wait for the commit of the immediate next checkpoint (note that a checkpoint instruction counter does not count stores) before updating memory.

Exemplary Methods Which Facilitate Processing of an Instruction in a Microarchitecture FIG. 3 presents a flowchart 300 illustrating a method which facilitates processing of an instruction in a microarchitecture in accordance with an aspect of the present application. During operation, the system determines a consumer instruction associated with a logical register ID and one or more operands with values output by one or more prior producer instructions (operation 302). The system allocates, in a register alias table entry, a physical register ID for the logical register ID (operation 304). The system creates, in a scheduler data structure, a first entry for the consumer instruction, wherein the first entry includes: a scheduler entry ID for the consumer instruction; the allocated physical register ID; a checkpoint ID; one or more scheduler entry IDs for the one or more prior producer instructions; and a release field which indicates whether to early release a physical register corresponding to the allocated physical register ID (operation 306). The system updates the register alias table entry to include the scheduler entry ID for the consumer instruction and the checkpoint ID associated with the consumer instruction (operation 308). The system receives, by the scheduler from the register alias table, a respective scheduler entry ID for a respective prior producer instruction and a checkpoint ID associated with the respective prior producer instruction (operation 310). Responsive to determining that the received checkpoint ID associated with the respective prior producer instruction does not match the checkpoint ID associated with the consumer instruction, the system sets, in a second entry in the scheduler data structure for the respective prior producer instruction, a release field to indicate that a physical register associated with the respective prior producer instruction is to remain allocated (operation 312).

Figure 4A:
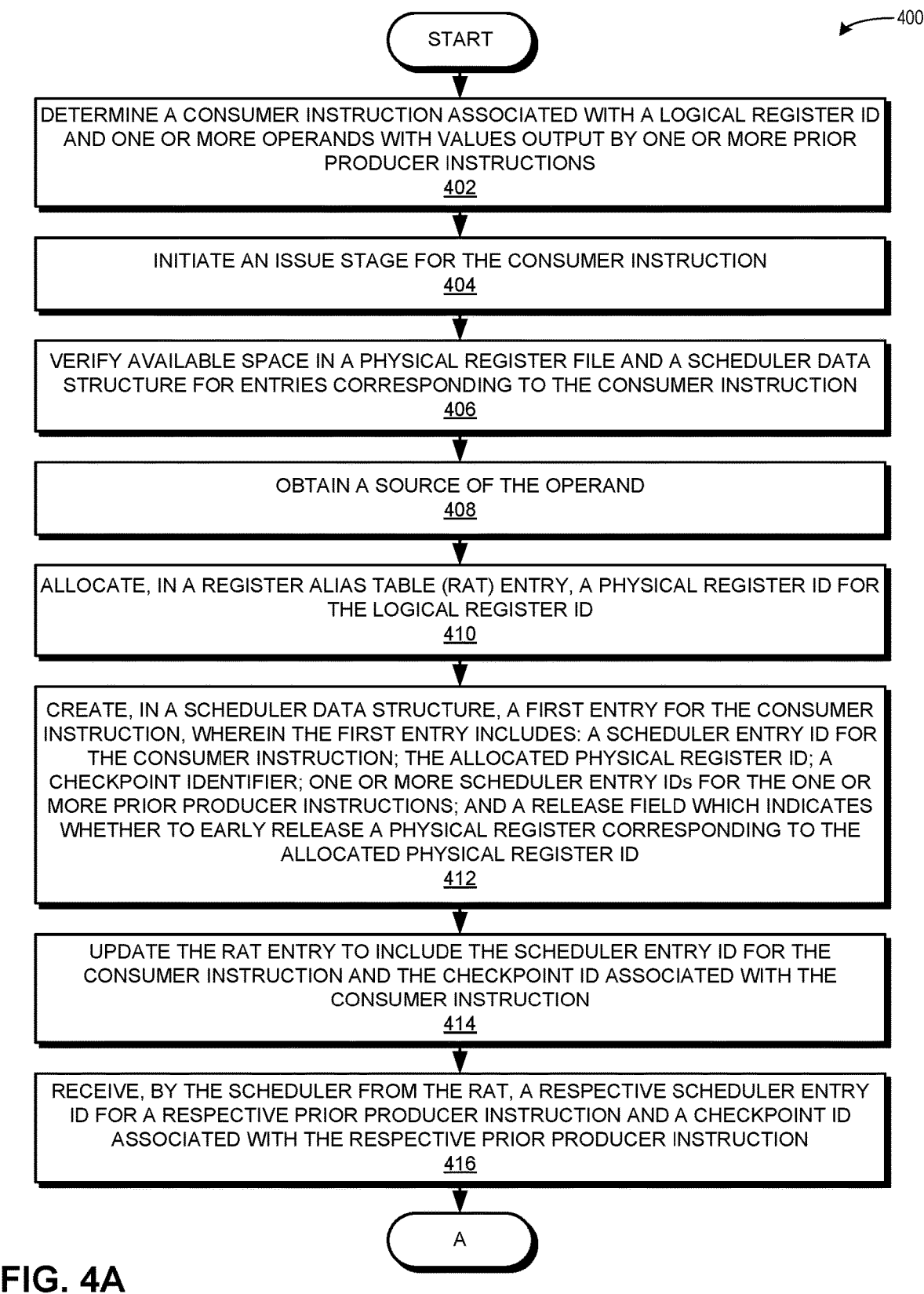
FIG. 4A presents a flowchart illustrating a method which facilitates processing of an instruction in a microarchitecture, including an issue stage, in accordance with an aspect of the present application.

FIG. 4A presents a flowchart 400 illustrating a method which facilitates processing of an instruction in a microarchitecture, including an issue stage, in accordance with an aspect of the present application. During operation, the system determines a consumer instruction associated with a logical register ID and one or more operands with values output by one or more prior producer instructions (operation 402, similar to operation 302). The system initiates an issue stage for the consumer instruction (operation 404). The system verifies available space in a physical register file and a scheduler data structure for entries corresponding to the consumer instruction (operation 406). The system obtains a source of the operand (or operands, if more than one operand is associated with the consumer instruction) (operation 408). As described above, the system can check the RAT to obtain the source of the operand, and one of two scenarios may occur: either the operand is ready, in which case the value is received from the physical register (whose ID is obtained from the RAT); or the operand is not yet ready, in which case the value will arrive from the CDB upon completion of the producer instruction.

The system allocates, in a register alias table entry, a physical register ID for the logical register ID (operation 410, similar to operation 304). The system creates, in a scheduler data structure, a first entry for the consumer instruction, wherein the first entry includes: a scheduler entry ID for the consumer instruction; the allocated physical register ID; a checkpoint ID; one or more scheduler entry IDs for the one or more prior producer instructions; and a release field which indicates whether to early release a physical register corresponding to the allocated physical register ID (operation 412 similar to operation 306). The system updates the register alias table entry to include the scheduler entry ID for the consumer instruction and the checkpoint ID associated with the consumer instruction (operation 414, similar to operation 308). The system receives, by the scheduler from the register alias table, a respective scheduler entry ID for a respective prior producer instruction and a checkpoint ID associated with the respective prior producer instruction (operation 416, similar to operation 310). The operation continues at Label A of FIG. 4B.

Figure 4B:
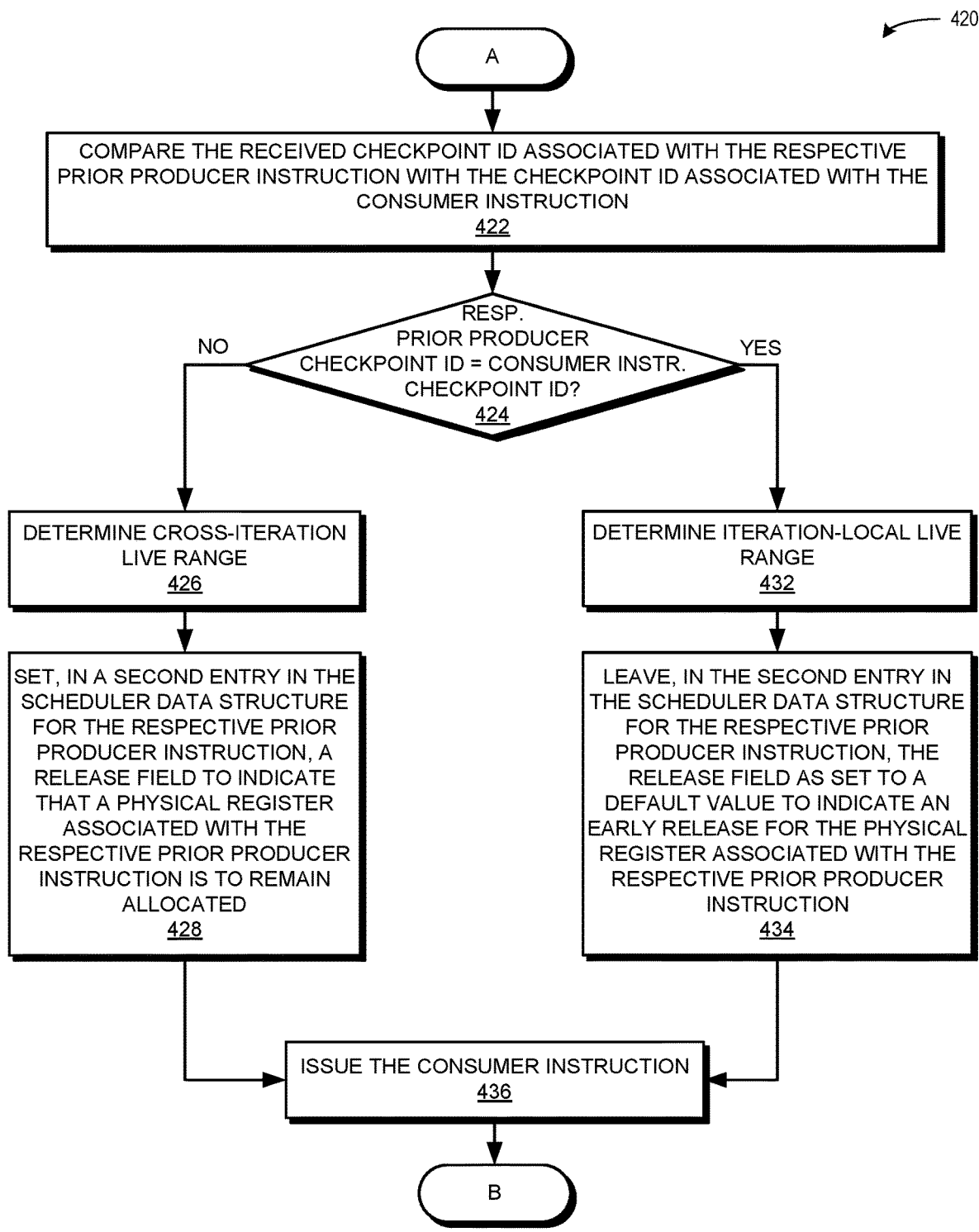
FIG. 4B presents a flowchart illustrating a method which facilitates processing of an instruction in a microarchitecture, including an issue stage, in accordance with an aspect of the present application.

FIG. 4B presents a flowchart 420 illustrating a method which facilitates processing of an instruction in a microarchitecture, including an issue stage, in accordance with an aspect of the present application. During operation, the system compares the received checkpoint ID associated with the respective prior producer instruction with the checkpoint ID associated with the consumer instruction (operation 422). If the respective prior producer instruction's checkpoint ID does not match the consumer instruction's checkpoint ID (decision 424) (i.e., different checkpoint IDs), the system determines a cross-iteration live range (operation 426), and sets, in a second entry in the scheduler data structure for the respective prior producer instruction, a release field to indicate that a physical register associated with the respective prior producer instruction is to remain allocated (operation 428).

If the prior producer instruction's checkpoint ID does match the consumer instruction's checkpoint ID (decision 424) (i.e., same checkpoint IDs), the system determines an iteration-local live range (operation 432), and leaves, in the second entry in the scheduler data structure for the respective prior producer instruction, the release field as set to a default value to indicate an early release for the physical register associated with the respective prior producer instruction (operation 434). The system issues the consumer instruction (operation 436), and the operation continues at Label B of FIG. 4C.

Figure 4C:
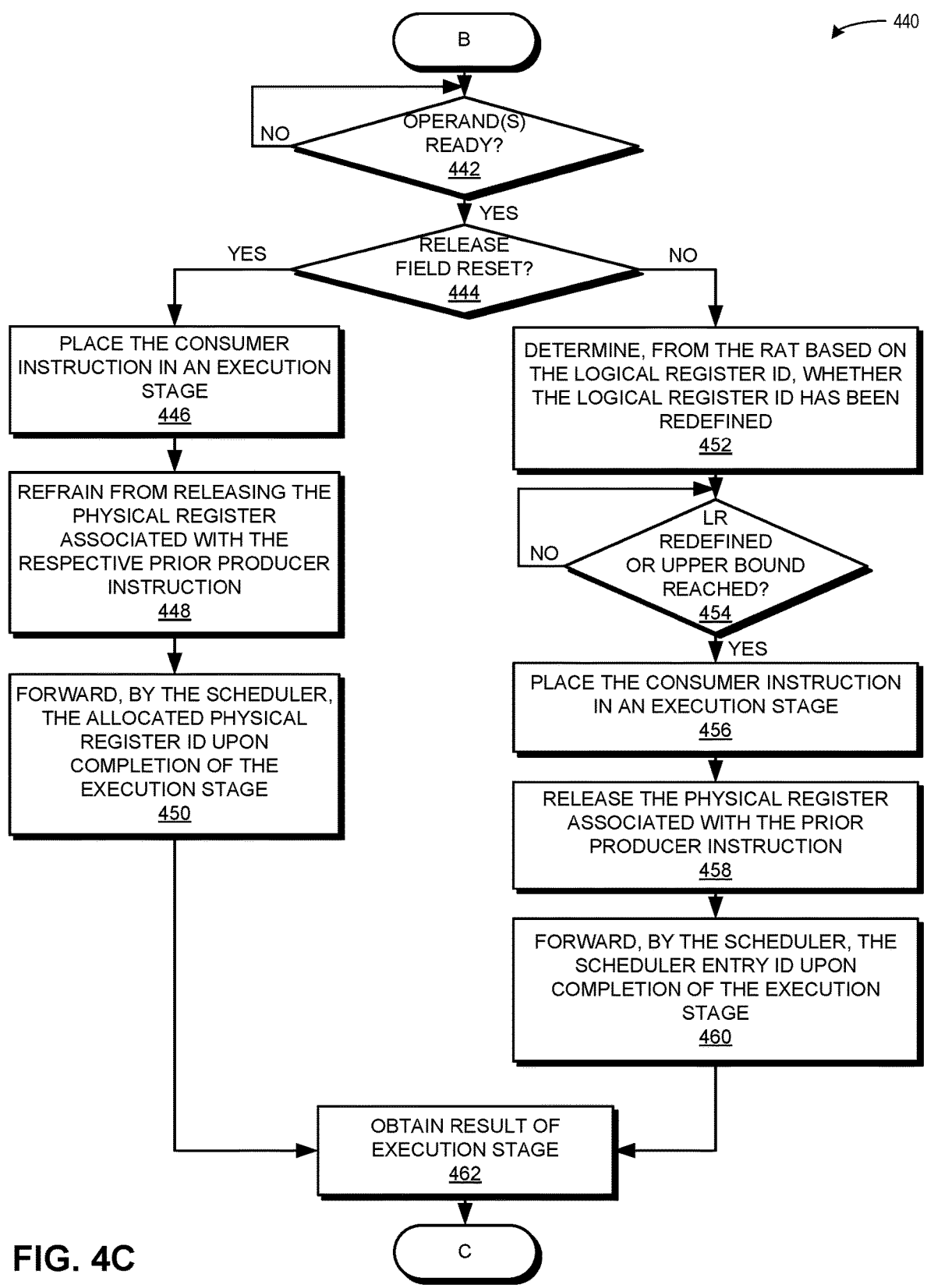
FIG. 4C presents a flowchart illustrating a method which facilitates processing of an instruction in a microarchitecture, including an execution stage, in accordance with an aspect of the present application.

FIG. 4C presents a flowchart 440 illustrating a method which facilitates processing of an instruction in a microarchitecture, including an execution stage, in accordance with an aspect of the present application. During operation determines if the operand(s) are ready (decision 442). That is, the system determines whether the value of an operand is output by the prior producer instruction, by monitoring the common data bus (CDB) to see if a broadcasted tag matches that of a waiting operand for the consumer instruction. If the operand(s) are not ready (decision 442), the operation waits and returns to decision 442. If the operand(s) are ready (decision 442), the system determines whether the release field in the consumer scheduler entry is reset (decision 444), i.e., whether the release field indicates that the physical register associated with the prior producer instruction is to remain allocated. Recall that the default value can be set to '1' to indicate early release for a given physical register, while a "reset" to a value of '0' indicates to keep the given physical register allocated.

If the release field in the first entry is reset (e.g., has a value of '0') (decision 444), the system places the consumer instruction in an execution stage (operation 446). The system refrains from releasing the physical register associated with the respective prior producer instruction (operation 448), and forwards, by the scheduler, the allocated physical register ID upon completion of the execution stage (operation 450). The forwarding can occur via the common data bus.

If the release field in the first entry is not reset (e.g., has a value of '1', which is the default value) (decision 444), the system determines, from the register alias table based on the logical register ID, whether the logical register ID has been redefined (operation 452). The register alias table can be directly indexed using the logical register ID. If the logical register has not been redefined or if an upper bound has not been reached (decision 454), the operation waits and returns to decision 454. The upper bound can be a predetermined upper threshold, which is used to prevent the consumer instruction from stalling while processing the consumer instruction. If the logical register has been redefined or if an upper bound has been reached (decision 454), the system places the consumer instruction in the execution stage (operation 456). The system releases the physical register associated with the prior producer instruction (operation 458), and forwards, by the scheduler, the scheduler entry ID for the consumer instruction upon completion of the execution stage (operation 460). The system obtains the result of the execution stage (e.g., from an execution unit, as described in Hennessy) (operation 462), and the operation continues at Label C of FIG. 4D.

Figure 4D:
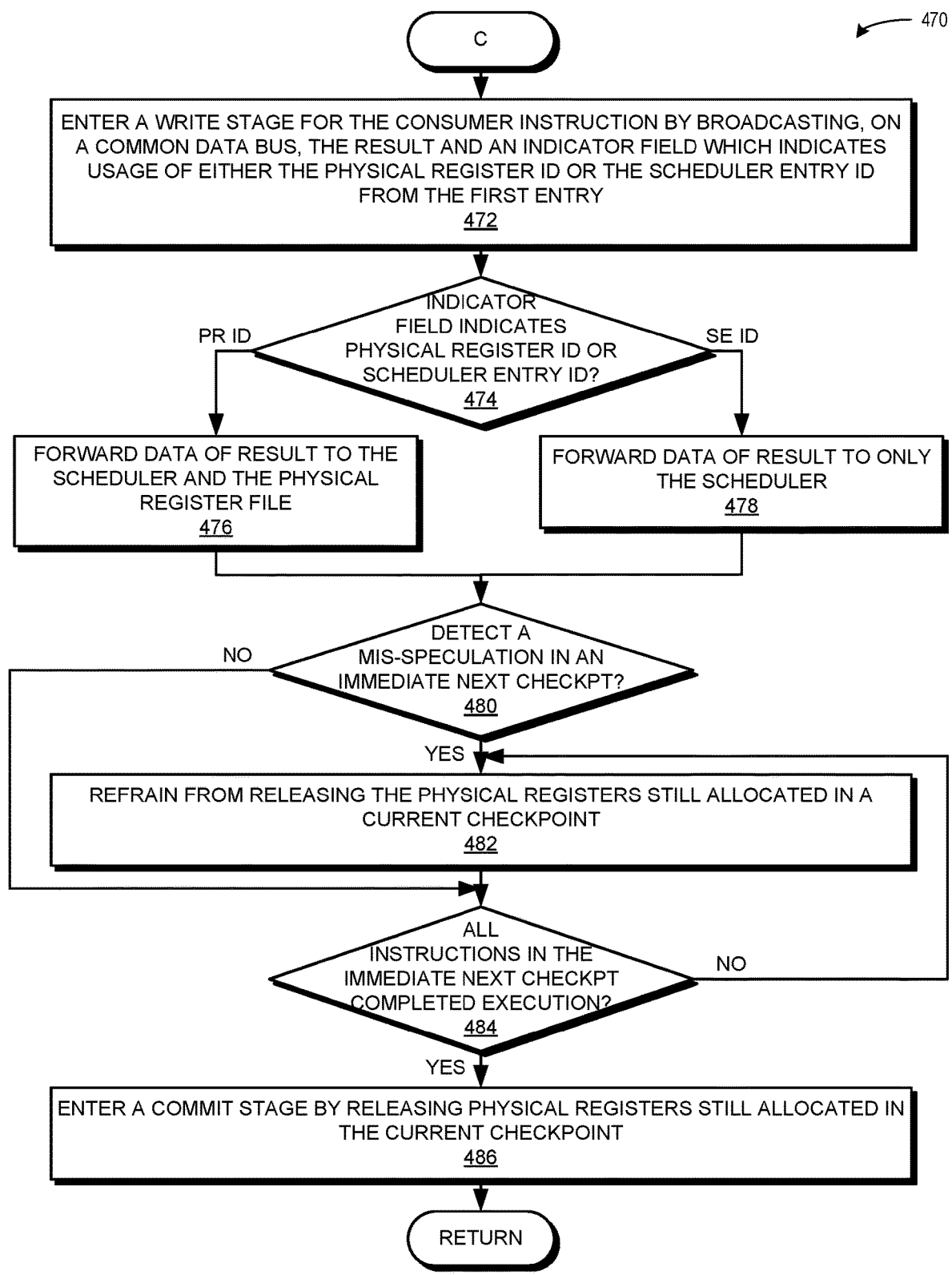
FIG. 4D presents a flowchart illustrating a method which facilitates processing of an instruction in a microarchitecture, including a write stage and a commit stage, in accordance with an aspect of the present application.

FIG. 4D presents a flowchart 470 illustrating a method which facilitates processing of an instruction in a microarchitecture, including a write stage and a commit stage, in accordance with an aspect of the present application. The system enters a write stage by broadcasting, on a common data bus, the result and an indicator field which indicates usage of either the physical register ID or the scheduler entry ID from the first entry (operation 472). If the indicator field indicates usage of the physical register ID (PRID) (decision 474), the system forwards the result to the scheduler and the physical register file (operation 476). If the indicator field indicates usage of the scheduler entry ID (SEID) (decision 474), the system forwards the result to only the scheduler (operation 478).

If the system does not detect a mis-speculation in the immediate next checkpoint (decision 480), the operation continues at decision 484. If the system does detect a mis-speculation in the immediate next checkpoint (decision 480), the system refrains from releasing the physical registers still allocated in the current checkpoint (operation 486).

If all instructions in the immediate next checkpoint have not completed execution (decision 484), the operation returns to operation 482. If all instructions in the immediate next checkpoint have completed execution (decision 484), the system enters a commit stage by releasing physical registers still allocated in the current checkpoint (operation 486). The operation returns.

Exemplary Computer System and Apparatus

Figure 5:
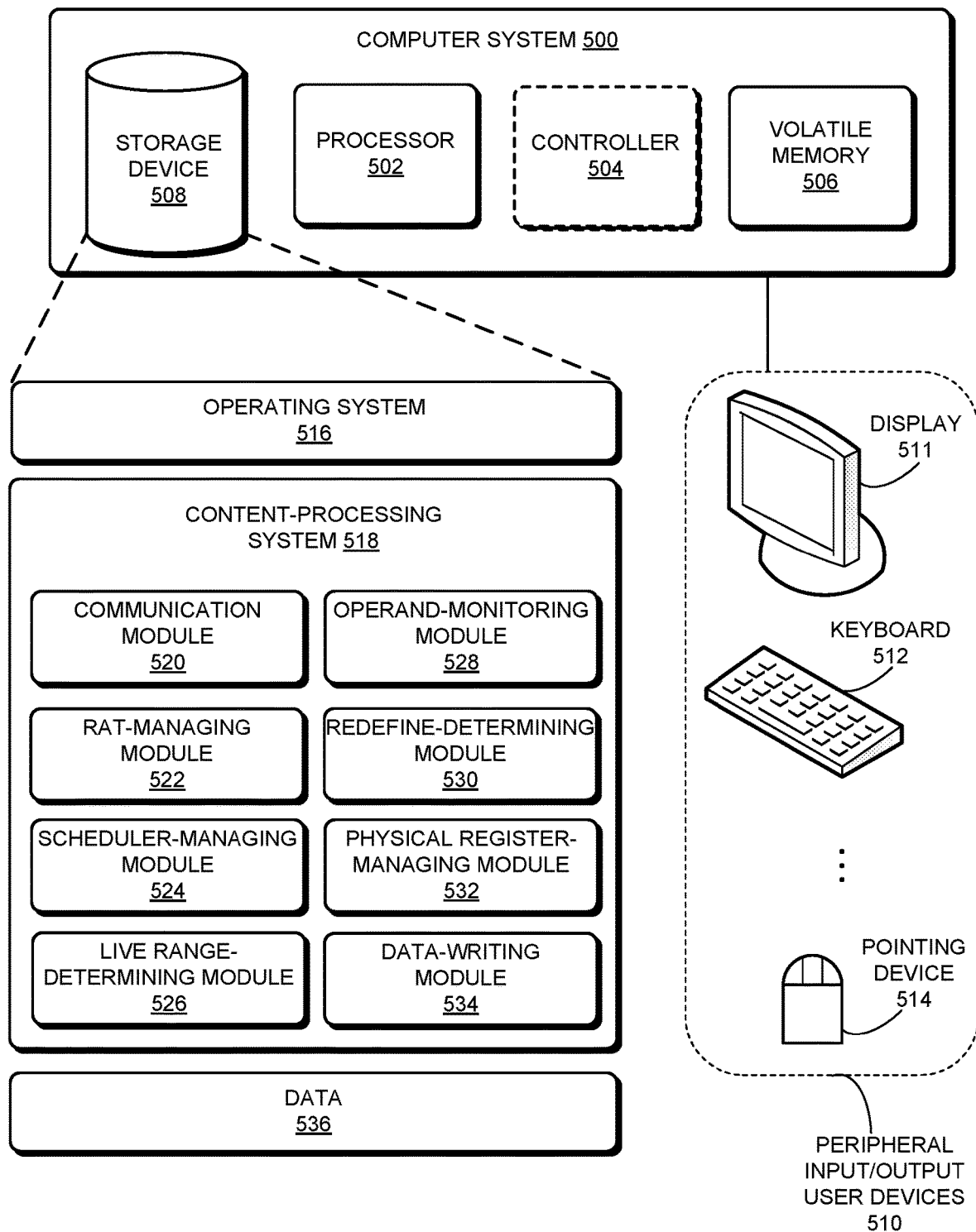
FIG. 5 illustrates an exemplary computer system which facilitates instruction-processing in a microarchitecture, in accordance with an aspect of the present application.

FIG. 5 illustrates an exemplary computer system which facilitates instruction-processing in a microarchitecture, in accordance with an aspect of the present application. Computer system 500 includes a processor 502, a volatile memory 506, and a storage device 508. In some aspects, computer system 500 can include a controller 504 (indicated by the dashed lines). Volatile memory 506 can include, e.g., random access memory (RAM), that serves as a managed memory, and can be used to store one or more memory pools. Storage device 508 can include persistent storage which can be managed or accessed via processor 502 (or controller 504). Furthermore, computer system 500 can be coupled to peripheral input/output (I/O) user devices 510, e.g., a display device 511, a keyboard 512, and a pointing device 514. Storage device 508 can store an operating system 516, a content-processing system 518, and data 536.

Content-processing system 518 can include instructions, which when executed by computer system 500, can cause computer system 500 or processor 502 to perform methods and/or processes described in this disclosure. Specifically, content-processing system 518 can include instructions for receiving and transmitting data packets or instructions within a microarchitecture (communication module 520).

Content-processing system 518 can further include instructions for determining a consumer instruction associated with a logical register ID and one or more operands with values output by one or more prior producer instructions (communication module 520). Content-processing system 518 can include instructions for allocating, in a register alias table entry, a physical register ID for the logical register ID (RAT-managing module 522). Content-processing system 518 can also include instructions for creating, in a scheduler data structure, a first entry for the consumer instruction, wherein the first entry includes: a scheduler entry ID for the consumer instruction; the allocated physical register ID; a checkpoint ID; one or more scheduler entry IDs for the one or more prior producer instructions; and a release field which indicates whether to early release a physical register corresponding to the allocated physical register ID (scheduler-managing module 524). Content-processing system 518 can include instructions for updating the register alias table entry to include the scheduler entry ID for the consumer instruction and the checkpoint ID associated with the consumer instruction (RAT-managing module 522). Content-processing system 518 can include instructions for receiving, by the scheduler from the register alias table, a respective scheduler entry ID for a respective prior producer instruction and a checkpoint ID associated with the respective prior producer instruction (communication module 520, RAT-managing module 522, and scheduler-managing module 524). Content-processing system 518 can also include instructions for, responsive to determining that the received checkpoint ID associated with the respective prior producer instruction does not match the checkpoint ID associated with the consumer instruction (live range-determining module 526), setting, in a second entry in the scheduler data structure for the respective prior producer instruction, a release field to indicate that a physical register associated with the respective prior producer instruction is to remain allocated (scheduler-managing module 524).

Content-processing system 518 can additionally include instructions for obtaining a source of an operand or monitoring for an operand value output by the respective prior producer instruction (operand-monitoring module). Content-processing system 518 can include instructions for releasing or refraining from releasing physical registers (physical register-managing module 530), based on determining whether a logical register has been redefined or if an upper threshold has been reached (redefine-determining module 530). Content-processing system 518 can include instructions for entering a write stage by broadcasting on a CDB, a result and an indicator field which indicates usage of either the physical register ID or the scheduler entry ID (data-writing module 534). While the modules depicted in FIG. 5 do not align exactly with the four instruction stages described here, in some aspects, the modules may align with the four instruction stages (i.e., issue, execution, write, and commit).

Data 536 can include any data that is required as input or generated as output by the methods and/or processes described in this disclosure. Specifically, data 536 can store at least: an instruction; a logical register ID; a physical register ID; an operand; an operand value; a scheduler data structure; an entry which includes a scheduler entry ID, a physical register ID, a checkpoint ID, a scheduler entry ID for a prior producer instruction, and a release field; a register alias table; an entry which includes a logical register ID, a physical register ID, a scheduler entry ID of a last instruction, and a checkpoint ID of a last instruction; a physical register file; an entry which includes a physical register ID, results, and a current checkpoint ID; a value which is broadcast; an indication of a stage of an instruction being processed, including an issue, execution, write, or commit stage; an indicator of an early release for a physical register or that the physical register is to remain allocated; an indication of an iteration or a loop; an indication of whether a register is used across iterations ("cross-iteration live range") or within an iteration ("iteration-local live range").

Figure 6:
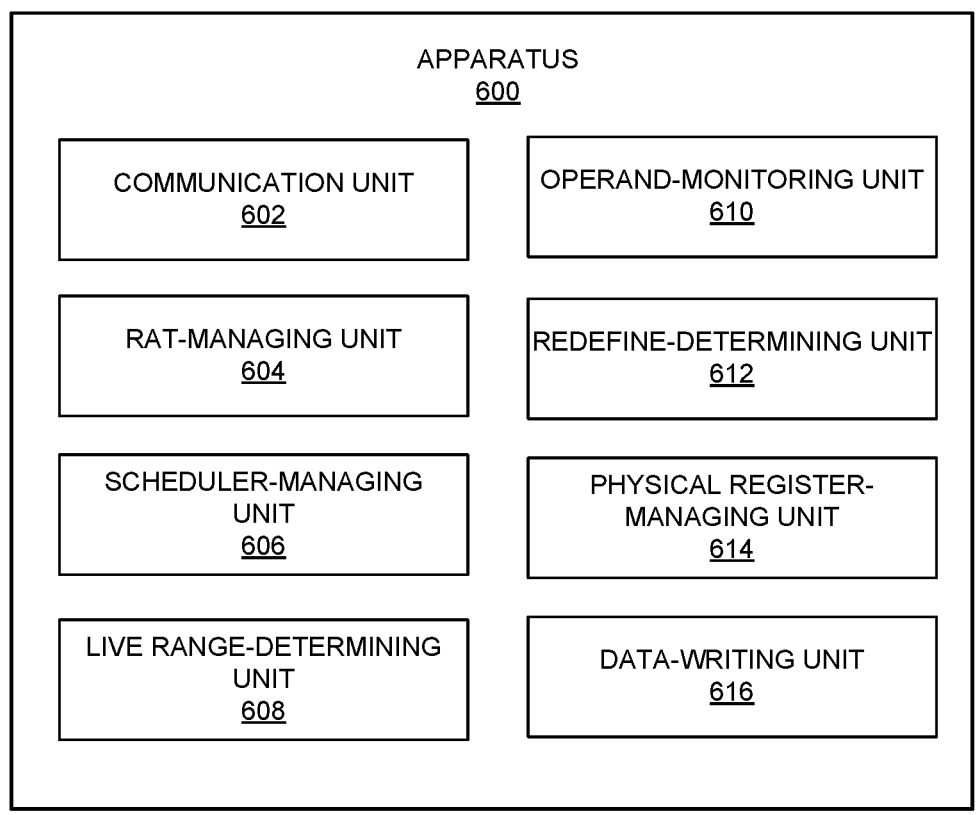
FIG. 6 illustrates an exemplary apparatus which facilitates instruction-processing in a microarchitecture, in accordance with an aspect of the present application.

FIG. 6 illustrates an exemplary apparatus 600 which facilitates dynamic allocation of space in a distributed filesystem, in accordance with an aspect of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Furthermore, apparatus 600 may be integrated in a computer system, or realized as a separate device or devices capable of communicating with other computer systems and/or devices.

Apparatus 600 may also include a non-volatile storage system or a memory management unit. Apparatus 600 can comprise modules or units 602-616 which are configured to perform functions or operations similar to modules 520-534 of computer system 500 of FIG. 5, including: a communication unit 602; a RAT-managing unit 604; a scheduler-managing unit 606; a live range-determining unit 608; an operand-monitoring unit 610; a redefine-determining unit 612; a physical register-managing unit 614; and a data-writing unit 616.

In general, the disclosed aspects provide a system which facilitates processing an instruction. In one aspect, during operation, the system determines a consumer instruction associated with a logical register identifier and one or more operands with values output by one or more prior producer instructions. The system allocates, in a register alias table entry, a physical register identifier for the logical register identifier. The system creates, in a scheduler data structure, a first entry for the consumer instruction, wherein the first entry includes: a scheduler entry identifier for the consumer instruction; the allocated physical register identifier; a checkpoint identifier; one or more scheduler entry identifiers for the one or more prior producer instruction; and a release field which indicates whether to early release a physical register corresponding to the allocated physical register identifier. The system updates the register alias table entry to include the scheduler entry identifier for the consumer instruction and the checkpoint identifier associated with the consumer instruction. The system receives, by the scheduler from the register alias table, a respective scheduler entry identifier for a respective prior producer instruction and a checkpoint identifier associated with the respective prior producer instruction. Responsive to determining that the received checkpoint identifier associated with the respective prior producer instruction does not match the checkpoint identifier associated with the consumer instruction, the system sets, in a second entry in the scheduler data structure for the respective prior producer instruction, a release field to indicate that a physical register associated with the respective prior producer instruction is to remain allocated.

In a variation on this aspect, responsive to determining that the received checkpoint identifier associated with the respective prior producer instruction does match the checkpoint identifier associated with the consumer instruction, the system leaves, in the second entry in the scheduler data structure for the respective prior producer instruction, the release field as set to a default value to indicate an early release for the physical register associated with the respective prior producer instruction.

In a further variation, the scheduler receives the respective scheduler entry identifier for the respective prior producer instruction based on a broadcast associated with an execution of the respective prior producer instruction and a respective corresponding output operand.

In a further variation, the system issues the consumer instruction and determines that the values of the operands are output by the one or more prior producer instructions. Responsive to determining that the release field in the first entry indicates that the physical register associated with the respective prior producer instruction is to remain allocated, the system performs the following operations: places the consumer instruction in an execution stage; refrains from releasing the physical register associated with the respective prior producer instruction; and forwards, by the scheduler, the allocated physical register identifier upon completion of the execution stage.

In a variation on this aspect, responsive to determining that the release field in the first entry indicates an early release for the physical register associated with the respective prior producer instruction: the system determines, from the register alias table based on the logical register identifier, whether the logical register identifier has been redefined; and responsive to determining that the logical register identifier has been redefined or responsive to determining that a predetermined upper threshold has been reached, the system performs the following operations. The system places the consumer instruction in the execution stage, releases the physical register associated with the respective prior producer instruction, and forwards, by the scheduler, the scheduler entry identifier for the consumer instruction upon completion of the execution stage.

In a further variation, the system obtains a result of the execution stage, and enters a write stage by broadcasting, on a common data bus, the result and an indicator field which indicates usage of either the physical register identifier or the scheduler entry identifier from the first entry. Responsive to determining that the indicator field indicates usage of the physical register identifier, the system forwards the result to the scheduler and a physical register file.

In a further variation, responsive to determining that the indicator field indicates usage of the scheduler entry identifier, the system forwards the result to only the scheduler.

In a further variation, a physical register file entry for a given physical register is updated to store a checkpoint identifier of a checkpoint which redefines the physical register. Responsive to detecting a mis-speculation in an immediate next checkpoint, the system refrains from releasing the physical registers still allocated in a current checkpoint.

In a further variation, responsive to detecting that all instructions in the immediate next checkpoint have completed an execution stage, the system enters a commit stage by releasing physical registers still allocated in the current checkpoint.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method for processing an instruction, the method comprising:
   determining a consumer instruction associated with a logical register identifier and one or more operands with values output by one or more prior producer instructions;
   allocating, in a register alias table entry, a physical register identifier for the logical register identifier;
   creating, in a scheduler data structure, a first entry for the consumer instruction, wherein the first entry includes: a scheduler entry identifier for the consumer instruction; the allocated physical register identifier; a checkpoint identifier; one or more scheduler entry identifiers for the one or more prior producer instructions; and a release field which indicates whether to early release a physical register corresponding to the allocated physical register identifier;
   updating the register alias table entry to include the scheduler entry identifier for the consumer instruction and the checkpoint identifier associated with the consumer instruction;
   receiving, by the scheduler from the register alias table, a respective scheduler entry identifier for a respective prior producer instruction and a checkpoint identifier associated with the respective prior producer instruction; and
   responsive to determining that the received checkpoint identifier associated with the respective prior producer instruction does not match the checkpoint identifier associated with the consumer instruction, setting, in a second entry in the scheduler data structure for the respective prior producer instruction, a release field to indicate that a physical register associated with the respective prior producer instruction is to remain allocated.

2. The method of claim 1, further comprising:
   responsive to determining that the received checkpoint identifier associated with the respective prior producer instruction does match the checkpoint identifier associated with the consumer instruction, leaving, in the second entry in the scheduler data structure for the respective prior producer instruction, the release field as set to a default value to indicate an early release for the physical register associated with the respective prior producer instruction.

3. The method of claim 1,
   wherein the scheduler receives the respective scheduler entry identifier for the respective prior producer instruction based on a broadcast associated with an execution of the respective prior producer instruction and a respective corresponding output operand.

4. The method of claim 1, further comprising:
   issuing the consumer instruction;
   determining that the values of the operands are output by the one or more prior producer instructions; and
   responsive to determining that the release field in the first entry indicates that the physical register associated with the respective prior producer instruction is to remain allocated:
      placing the consumer instruction in an execution stage;
      refraining from releasing the physical register associated with the respective prior producer instruction; and
      forwarding, by the scheduler, the allocated physical register identifier upon completion of the execution stage.

5. The method of claim 4, further comprising:
   responsive to determining that the release field in the first entry indicates an early release for the physical register associated with the respective prior producer instruction:
      determining, from the register alias table based on the logical register identifier, whether the logical register identifier has been redefined; and
      responsive to determining that the logical register identifier has been redefined or responsive to determining that a predetermined upper threshold has been reached:
         placing the consumer instruction in the execution stage;
         releasing the physical register associated with the respective prior producer instruction; and
         forwarding, by the scheduler, the scheduler entry identifier for the consumer instruction upon completion of the execution stage.

6. The method of claim 5, further comprising:
   obtaining a result of the execution stage;
   entering a write stage by broadcasting, on a common data bus, the result and an indicator field which indicates usage of either the physical register identifier or the scheduler entry identifier from the first entry; and
   responsive to determining that the indicator field indicates usage of the physical register identifier, forwarding the result to the scheduler and a physical register file.

7. The method of claim 6, further comprising:
   responsive to determining that the indicator field indicates usage of the scheduler entry identifier, forwarding the result to only the scheduler.

8. The method of claim 1, wherein a physical register file entry for a given physical register is updated to store a checkpoint identifier of a checkpoint which redefines the physical register, and wherein the method further comprises:
   responsive to detecting a mis-speculation in an immediate next checkpoint, refraining from releasing the physical registers still allocated in a current checkpoint.

9. The method of claim 8, further comprising:
   responsive to detecting that all instructions in the immediate next checkpoint have completed an execution stage, entering a commit stage by releasing physical registers still allocated in the current checkpoint.

10. A computer system, comprising:
   a processor; and
   a memory coupled to the processor and storing instructions which, when executed by the processor, cause the processor to perform a method, the method comprising:
      determining a consumer instruction associated with a logical register identifier and one or more operands with values output by one or more prior producer instructions;

allocating, in a register alias table entry, a physical
register identifier for the logical register identifier;
creating, in a scheduler data structure, a first entry for
the consumer instruction, wherein the first entry
includes: a scheduler entry identifier for the consumer instruction; the allocated physical register
identifier; a checkpoint identifier; one or more scheduler entry identifiers for the one or more prior
producer instructions; and a release field which indicates whether to early release a physical register
corresponding to the allocated physical register identifier;
updating the register alias table entry to include the
scheduler entry identifier for the consumer instruction and the checkpoint identifier associated with the
consumer instruction;
receiving, by the scheduler from the register alias table,
a respective scheduler entry identifier for a respective prior producer instruction and a checkpoint
identifier associated with the respective prior producer instruction; and
responsive to determining that the received checkpoint
identifier associated with the respective prior producer instruction does not match the checkpoint
identifier associated with the consumer instruction,
setting, in a second entry in the scheduler data
structure for the respective prior producer instruction, a release field to indicate that a physical register
associated with the respective prior producer instruction is to remain allocated.

11. The computer system of claim 10, wherein the method further comprises:
responsive to determining that the received checkpoint
identifier associated with the respective prior producer
instruction does match the checkpoint identifier associated with the consumer instruction, leaving, in the
second entry in the scheduler data structure for the
respective prior producer instruction, the release field
as set to a default value to indicate an early release for
the physical register associated with the respective
prior producer instruction.

12. The computer system of claim 10,
wherein the scheduler receives the respective scheduler
entry identifier for the respective prior producer
instruction based on a broadcast associated with an
execution of the respective prior producer instruction
and a respective corresponding output operand.

13. The computer system of claim 10, wherein the method further comprises:
issuing the consumer instruction;
determining that the values of the operands are output by
the one or more prior producer instructions; and
responsive to determining that the release field in the first
entry indicates that the physical register associated with
the respective prior producer instruction is to remain
allocated:
placing the consumer instruction in an execution stage;
refraining from releasing the physical register associated with the respective prior producer instruction;
and
forwarding, by the scheduler, the allocated physical
register identifier upon completion of the execution
stage.

14. The computer system of claim 13, wherein the method further comprises:
responsive to determining that the release field in the first
entry indicates an early release for the physical register
associated with the respective prior producer instruction:
determining, from the register alias table based on the
logical register identifier, whether the logical register
identifier has been redefined; and
responsive to determining that the logical register identifier has been redefined or responsive to determining
that a predetermined upper threshold has been
reached:
placing the consumer instruction in the execution
stage;
releasing the physical register associated with the
respective prior producer instruction; and
forwarding, by the scheduler, the scheduler entry
identifier for the consumer instruction upon
completion of the execution stage.

15. The computer system of claim 14, wherein the method further comprises:
obtaining a result of the execution stage;
entering a write stage by broadcasting, on a common data
bus, the result and an indicator field which indicates
usage of either the physical register identifier or the
scheduler entry identifier from the first entry; and
responsive to determining that the indicator field indicates
usage of the physical register identifier, forwarding the
result to the scheduler and a physical register file.

16. The computer system of claim 15, wherein the method further comprises:
responsive to determining that the indicator field indicates
usage of the scheduler entry identifier, forwarding the
result to only the scheduler.

17. The computer system of claim 10, wherein a physical
register file entry for a given physical register is updated to
store a checkpoint identifier of a checkpoint which redefines
the physical register, and wherein the method further comprises:
responsive to detecting a mis-speculation in an immediate
next checkpoint, refraining from releasing the physical
registers still allocated in a current checkpoint.

18. The computer system of claim 17, wherein the method further comprises:
responsive to detecting that all instructions in the immediate next checkpoint have completed an execution
stage, entering a commit stage by releasing physical
registers still allocated in the current checkpoint.

19. A non-transitory computer-readable storage medium
storing instructions that when executed by a computer cause
the computer to perform a method, the method comprising:
determining a consumer instruction associated with a
logical register identifier and one or more operands
with values output by one or more prior producer
instructions;
allocating, in a register alias table entry, a physical register
identifier for the logical register identifier;
creating, in a scheduler data structure, a first entry for the
consumer instruction, wherein the first entry includes:
a scheduler entry identifier for the consumer instruction; the allocated physical register identifier; a checkpoint identifier; one or more scheduler entry identifiers
for the one or more prior producer instructions; and a
release field which indicates whether to early release a
physical register corresponding to the allocated physical register identifier;

updating the register alias table entry to include the scheduler entry identifier for the consumer instruction and the checkpoint identifier associated with the consumer instruction;

receiving, by the scheduler from the register alias table, a respective scheduler entry identifier for a respective prior producer instruction and a checkpoint identifier associated with the respective prior producer instruction; and responsive to determining that the received checkpoint identifier associated with the respective prior producer instruction does not match the checkpoint identifier associated with the consumer instruction, setting, in a second entry in the scheduler data structure for the respective prior producer instruction, a release field to indicate that a physical register associated with the respective prior producer instruction is to remain allocated.

20. The storage medium of claim 19, wherein the method further comprises:

issuing the consumer instruction;

determining that the values of the operands are output by the one or more prior producer instructions; and responsive to determining that the release field in the first entry indicates an early release for the physical register associated with the respective prior producer instruction:

determining, from the register alias table based on the logical register identifier, whether the logical register identifier has been redefined; and responsive to determining that the logical register identifier has been redefined or responsive to determining that a predetermined upper threshold has been reached:

placing the consumer instruction in the execution stage;

releasing the physical register associated with the respective prior producer instruction; and forwarding, by the scheduler, the scheduler entry identifier for the consumer instruction upon completion of the execution stage.

* * * * *